United States Patent [19]

McBiles

[11] Patent Number: 4,528,526
[45] Date of Patent: Jul. 9, 1985

[54] PSK MODULATOR WITH NONCOLLAPSABLE OUTPUT FOR USE WITH A PLL POWER AMPLIFIER

[75] Inventor: Carol D. McBiles, Paradise Valley, Ariz.

[73] Assignee: Motorola, Inc., Schaumburg, Ill.

[21] Appl. No.: 499,585

[22] Filed: May 31, 1983

[51] Int. Cl.³ .............................................. H03C 3/00
[52] U.S. Cl. ..................... 332/16 R; 332/21; 332/23 R; 375/54; 375/67
[58] Field of Search .............. 332/16 R, 18, 21, 22, 332/23 R, 23 A; 375/52, 53, 54, 55, 56, 57, 67

[56] References Cited

U.S. PATENT DOCUMENTS

| | | | |
|---|---|---|---|
| 3,475,626 | 10/1969 | Holzman et al. | 332/16 |
| 3,699,479 | 10/1972 | Thompson et al. | 332/16 R |
| 3,818,378 | 6/1974 | Phillips | 332/23 A |
| 3,914,695 | 10/1975 | Giusto | 375/67 |
| 3,973,201 | 8/1976 | Andren | 332/23 R X |
| 4,006,418 | 2/1977 | Liskov et al. | 332/21 X |
| 4,156,851 | 5/1979 | Winters | 332/16 R X |
| 4,320,499 | 3/1982 | Muilwijk et al. | 375/53 X |
| 4,338,579 | 7/1982 | Rhodes | 332/21 |

FOREIGN PATENT DOCUMENTS

| | | | |
|---|---|---|---|
| 0044230 | 1/1982 | European Pat. Off. | 375/53 |
| 62407 | 5/1981 | Japan | 332/17 |

Primary Examiner—Eugene R. LaRoche
Assistant Examiner—D. C. Mis
Attorney, Agent, or Firm—Eugene A. Parsons

[57] ABSTRACT

A PSK modulator for use with a phase lock locked loop power amplifier circuit in a communications transmitter wherein one signal channel of the modulator includes a delay equal to one-fiftieth of the period of the highest bit rate applied to the modulator so that the amplitude of the modulator output signal does not collapse to zero.

5 Claims, 7 Drawing Figures

A. IDEAL QPSK SIGNAL WITHOUT FILTERING
(180° PHASE CHANGE)

B. IDEAL QPSK SIGNAL WITH HEAVY FILTERING
(180° PHASE CHANGE)

C. QPSK SIGNAL WITH FILTERING & IMPERFECT MIXER
(180° PHASE CHANGE)

4,528,526

PSK MODULATOR WITH NONCOLLAPSABLE OUTPUT FOR USE WITH A PLL POWER AMPLIFIER

BACKGROUND OF THE INVENTION

RF communications transmitters, especially in the military, use broadband power amplifiers and conventional mixers to translate phase modulated intermediate frequencies (IFs) to the desired radio frequency (RF). However, future trends in radio production, and especially the military, are to use phase locked loops (PLLs) in the power amplifier chain from the IF to RF, to band limit the noise power radio output to the phase locked loop bandwidth. The phase locked loop power amplifier is not compatible with previous BPSK and QPSK modulators because the output of these modulators has a tendency to collapse to zero in certain situations, whereupon the phase locked loop power amplifier drops out of the locked mode of operation. This loss of lock in the phase locked loop power amplifier can be a serious problem.

SUMMARY OF THE INVENTION

The present invention pertains to a PSK modulator for use with either wideband power amplifier up converter circuits or phase locked loop power amplifiers in a communications transmitter wherein one signal channel of the PSK modulator includes a signal delay to prevent the signal amplitude of the output of the PSK modulator from collapsing to zero.

It is an object of the present invention to provide a new and improved PSK modulator for use with phase locked loop power amplifier circuits.

It is a further object of the present invention to provide an improved PSK modulator wherein the amplitude of the output signal is prevented from collapsing to zero so that it can be utilized with a phase locked loop power amplifier.

These and other objects of this invention will become apparent to those skilled in the art upon consideration of the accompanying specification, claims and drawings.

BRIEF DESCRIPTION OF THE DRAWINGS

Referring to the drawings.

DETAILED DESCRIPTION OF THE PRIOR ART

Figure 1:
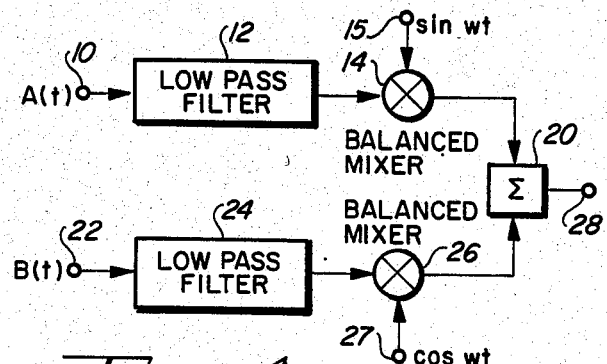
FIG. 1 is a simplified block diagram of a prior art PSK modulator.

Referring specifically to FIG. 1, a prior art phase shift keyed (PSK) modulator is illustrated. Throughout this disclosure the term PSK is utilized to indicate any phase shift keyed modulators incorporating at least two signal channels, such as biphase shift keyed (BPSK) and quadrature phase shift keyed (QPSK). In the PSK modulator of FIG. 1 a first input 10 is adapted to receive an input digital data signal A(t). The digital data signal is supplied through a low pass filter 12 to a first input of a balanced mixer 14. The balanced mixer 14 has a second input 15 adapted to receive a sinusoidal signal thereon, sin ωt. The low pass filter 12 and mixer 14 constitute a first, or in-phase, signal channel the output of which is connected to one input of a combining or summation circuit 20. A second channel of the modulator includes an input 22, adapted to receive an input digital data signal B(t), which signal is supplied through a low pass filter 24 to a first input of a balanced mixer 26. A second input 27 of the balanced mixer 26 is adapted to receive a sinusoidal signal, cos ωt. The output of the second channel is supplied to a second input of the summation circuit 20. The combined outputs of the two channels appear at the output of the summation circuit 20, illustrated herein as terminal 28, which output signal is the intermediate frequency (IF) of the transmitter and is represented by the following equation.

$$IF = A(t) \sin \omega t + B(t) \cos \omega t \quad (1)$$
$$= 2 \sin (\omega t + \phi)$$

where $\phi = \pm \frac{\pi}{4}, \pm \frac{3\pi}{4}$

Figure 2:
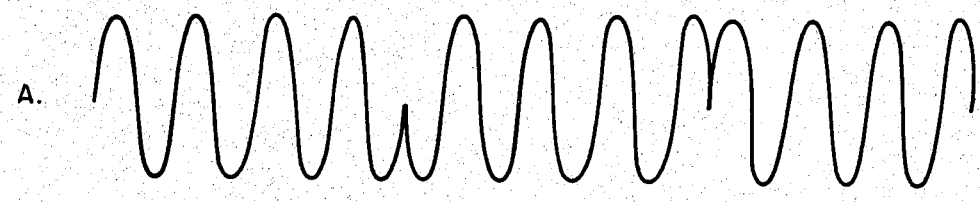
FIGS. 2A-D illustrates four filtered, nonfiltered and modulator output signals.
Figure 2:
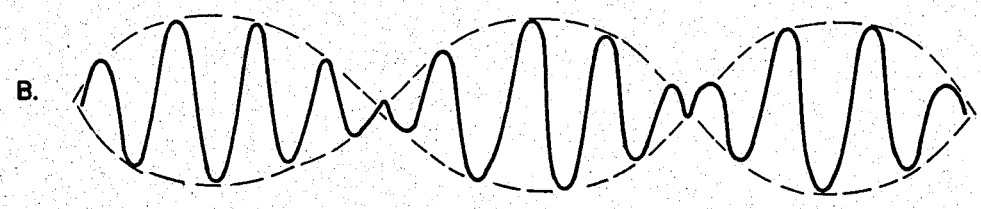
Figure 2:
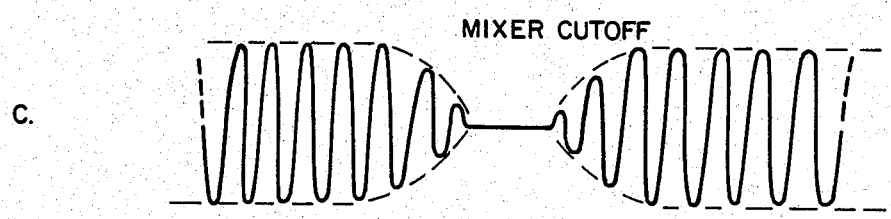
Figure 2:
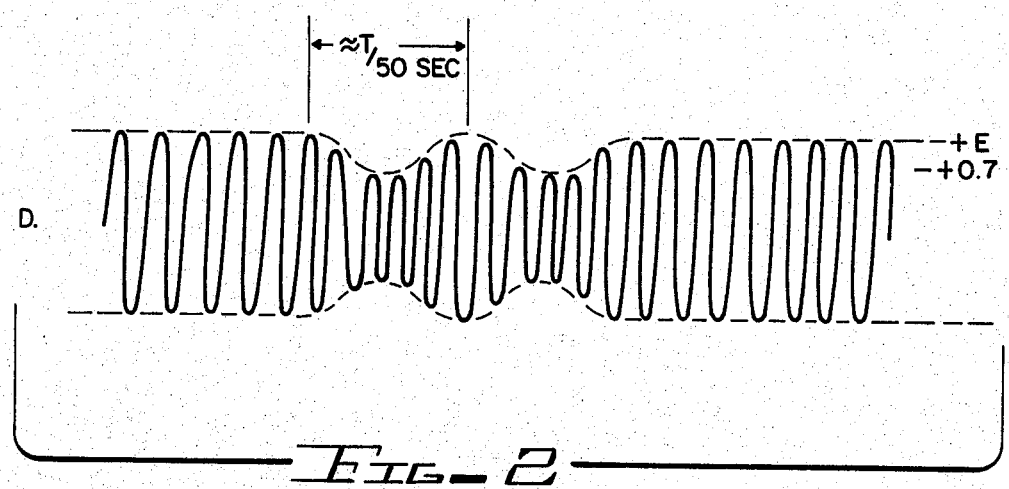

It is common practice to filter the input digital data, as illustrated in FIG. 1, to suppress the sideband power, since adjacent RF channels can be closely spaced. The effect of this filtering is illustrated in FIG. 2. Waveform A of FIG. 2 illustrates an ideal QPSK signal without filtering. Waveform B of FIG. 2 illustrates the ideal QPSK signal with heavy filtering. Waveform C of FIG. 2 illustrates the QPSK signal with filtering and imperfect mixing. Due to diode thresholds of conventional balanced mixers, the amplitude output of the modulator will collapse to zero, as illustrated in waveform C of FIG. 2, for a period of time which may be significant when the modulator IF output signal is used to drive a transmitter using a phase locked loop in the power amplifier chain.

DESCRIPTION OF THE PREFERRED EMBODIMENT

Figure 3:
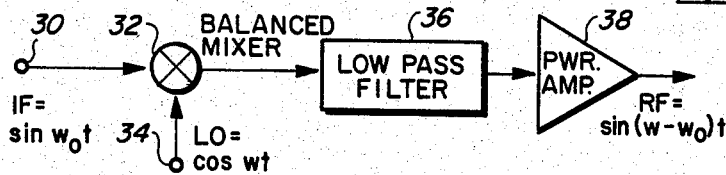
FIG. 3 is a simplified block diagram of a wideband power amplifier.

Referring specifically to FIG. 3, a simplified block diagram of a wideband power amplifier circuit for use in a communications transmitter is illustrated. This type of power amplifier is commonly used in communications transmitters, and especially military type transmitters, at the present time. The wideband power amplifier is insensitive to the amplitude modulation, as illustrated in waveforms B and C of FIG. 2, commonly associated with balanced mixer type PSK modulators, since the amplifying process is essentially linear from input to output. The IF signal from the modulator (for example the modulator of FIG. 1) is applied to an input terminal 30 which is connected to one input of a balanced mixer 32. A second input 34 of the balanced mixer 32 is adapted to receive a local oscillator signal thereon so that the output of the mixer 32 is at the desired transmission (RF) frequency. The signal output from the mixer 32 is supplied through a low pass filter 36 to a power amplifier chain 38 which supplies the power required for transmission.

Figure 4:
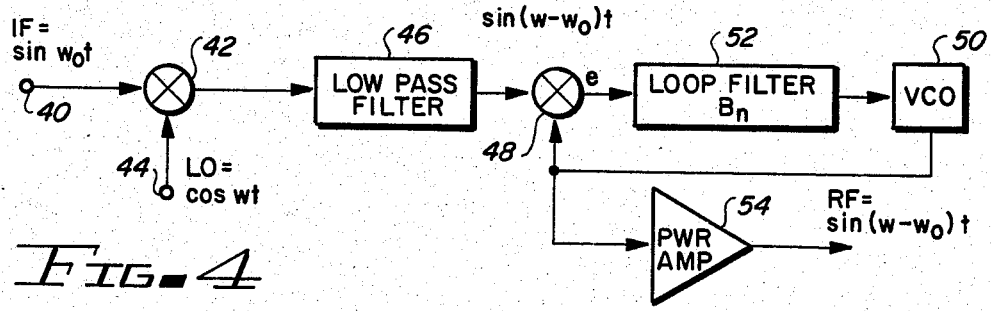
FIG. 4 is a simplified block diagram of a phase locked loop power amplifier.

Referring specifically to FIG. 4, a simplified block diagram of a phase locked loop power amplifier is disclosed. In this power amplifier the IF output signal from the modulator is again supplied to an input terminal 40 which is connected to a first input of a mixer 42. A local oscillator signal is supplied to a second input 44 of the mixer 42 to raise the signal to the desired frequency. The output of the mixer 42 is supplied through a low pass filter 46 to the first input of a second mixer 48. A second input of the mixer 48 receives a signal from a voltage-controlled oscillator (VCO) 50. The oscillator 50 is operating at approximately the frequency of the RF signal supplied to the mixer 48 from the filter 46. The mixer 48 operates as a phase detector with the output being an error signal indicative of the difference in phase between the output signal from the filter 46 and the output signal from the VCO 50. This error signal is filtered in a loop filter 52 and applied to the control input of the VCO 50 to control the frequency thereof. The output signal from the VCO 50 is also supplied to a power amplifier chain 54 which provides the power required for transmission. While a specific embodiment of a PLL amplifier is disclosed herein, it will be understood by those skilled in the art that many variations and other embodiments are possible and are intended to come within the scope of this invention.

Figure 5:
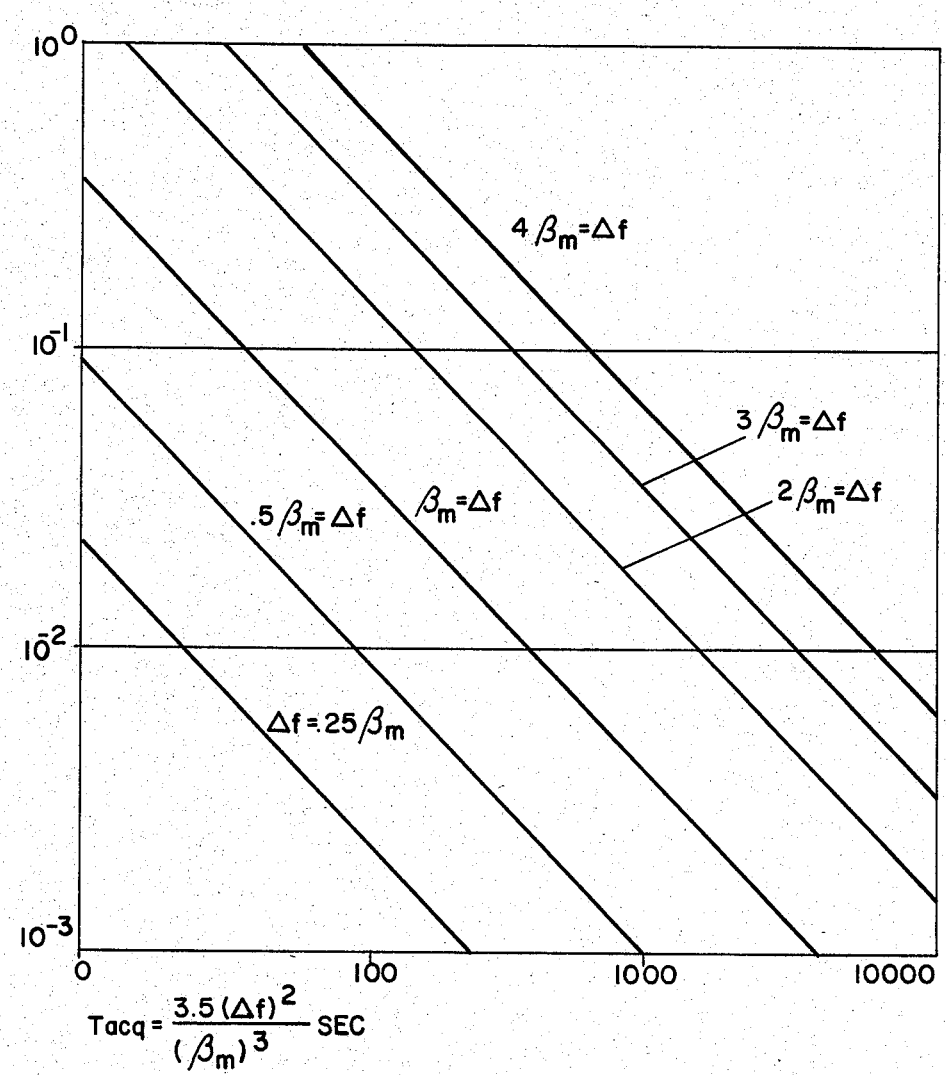
FIG. 5 is a plot of loop acquisition time for various changes of operating frequency for the amplifier illustrated in FIG. 4.

It can be seen that any amplitude modulation on the IF signal supplied to the terminal 40 will be transformed to phase modulation on the output RF signal from the power amplifiers 54. If the amplitude of the input IF signal at terminal 40 goes to zero the error signal, e, at the output of the phase detector 48 will be lost and the VCO 50 will be driven towards its natural rest frequency. If the VCO 50 changes frequency an amount $\Delta f$ from its locked state due to a loss in input signal, the amount of time required for the loop to reacquire lock (reacquisition time) is given by:

$$T_{acq} \simeq \frac{3.5\,(\Delta f)^2}{(B_n)^3} \quad (2)$$

where $B_n$ is the phase locked loop single-sided noise bandwidth of the loop. Referring to FIG. 5, a plot of loop acquisition time for various changes of frequency in the VCO 50 is illustrated, with each change of frequency being expressed as a fraction of the loop noise bandwidth, $B_n$. From this plot it can be seen that small changes in frequency can result in a significant amount of time for the loop to reacquire lock. If the reacquisition time of the loop is a significant part of the period between data transitions, the PSK modulation at the RF output from power amplifier 54 can be degraded to the point of uselessness.

Figure 6:
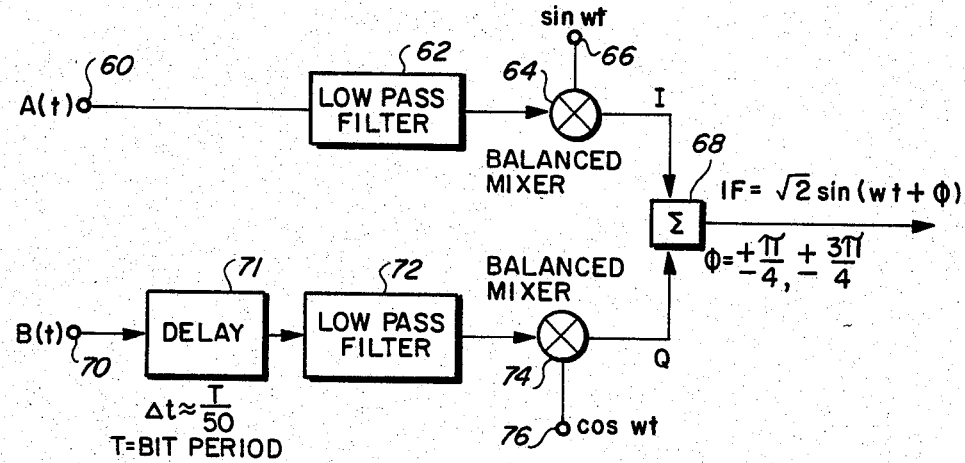
FIG. 6 is a simplified block diagram of a PSK modulator incorporating the present invention.

Referring specifically to FIG. 6, a simplified block diagram of a PSK modulator embodying the present invention is illustrated. A first digital signal input 60 is adapted to receive input data signal A(t). The signal is supplied through a low pass filter 62 to a first input of a balanced mixer 64. A second input 66 of the mixer 64 is adapted to receive a sinusoidal signal, sin ωt. The output signal from the balanced mixer 64 is the in-phase component and is supplied to a first input of a summation circuit 68. The filter 62 and mixer 64 constitute a first signal channel. A second digital signal input 70 is adapted to receive a digital data signal B(t). This digital signal is supplied through a delay circuit 71 and a low pass filter 72 to a first input of a balanced mixer 74. A second input 76 of the balanced mixer 74 is adapted to receive a signal, cos ωt. The output of the mixer 74, which is the quadrature phase signal, is supplied to a second input of the summation circuit 68.

Figure 7:
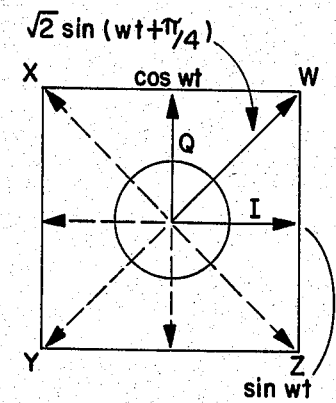
FIG. 7 is a phasor representation of the output of the PSK modulator illustrated in FIG. 6.

The delay circuit 71 introduces a delay of approximately T/50 seconds in the second or Q channel, where T is the period of the highest bit (or symbol) rate used to drive the modulator. This delay causes the Q channel drive to the balanced mixer 74 to lag the I channel drive to the balanced mixer 64. Referring specifically to FIG. 7, if the input digital signals A(t) and B(t) change states simultaneously, the tip of the resultant phasor will follow the square illustrated in FIG. 7 from W to X when the I channel vector amplitude drops from +1 to 0 and then builds back up to a −1 along the horizontal path. T/50 seconds later the tip of the phasor will follow the square from X to Y as the Q channel vector amplitude drops from +1 to 0 and then builds back up to −1 along the vertical path. In the same fashion the phasor will continue around the square, never dropping to zero. The amplitude of the IF signal from the modulator will be reduced no more than 0.707 from its maximum amplitude during any transition from one phase state to any other phase state. Waveform D of FIG. 2 illustrates an amplitude-versus-time representation of a 180 degree phase change for PSK modulator of FIG. 6. Thus, it can be seen that the drive to the phase locked loop power amplifier of FIG. 4 will be maintained, lock will not be lost and the reacquisition time is not a problem.

The specific delay 71 incorporated herein was incorporated by utilizing a pair of gates with an RC time constant therebetween to change the switching time and provide the required amount of delay. It will of course be understood by those skilled in the art that different amounts of delay may be utilized and different circuits may be incorporated to provide the amount of delay desired in either of the channels. While I have shown and described a specific embodiment of this invention, further modifications and improvements will occur to those skilled in the art. I desire it to be understood, therefore, that this invention is not limited to the particular form shown and I intend in the appended claims to cover all modifications which do not depart from the spirit and scope of this invention.

I claim:

1. In a PSK modulator for use with wideband power amplifier up converter circuits and phase locked loop power amplifier circuits in a communications transmitter, wherein said PSK modulator includes two signal channels, the improvement comprising a signal delay in one of the signal channels, approximately one-fiftieth of the period of the highest bit rate applied to the modulator, to prevent the amplitude of an output signal of the PSK modulator from collapsing to zero.

2. A PSK modulator for use in a communications transmitter comprising:
   first and second signal channels each including a filter and a balanced mixer,
   summing circuitry connected to each of said first and second signal channels to combine the output signals therefrom to produce a combined output signal; and
   a signal delay in one of said first and second signal channels, approximately one fiftieth of the period of the highest bit rate applied to the modulator, to prevent the amplitude of the combined output signal from collapsing to zero.

3. A PSK modulator as claimed in claim 2 including in addition a phase locked loop power amplifier connected to receive the combined output signals from the summing circuit.

4. A PSK modulator as claimed in claim 2 wherein the signal delay includes an R-C time constant.

5. In conjunction with a dual signal channel PSK modulator incorporated into a communications transmitter utilizing a phase locked loop power amplifier, a method of preventing the loss of lock in the power amplifier comprising the step of altering the phase of signals in at least one of the signal channels, approximately one fiftieth of the period of the highest data bit rate used, to prevent output signals of said PSK modulator from collapsing to zero.

* * * * *